June 10, 1969 E. E. THIESSEN ET AL 3,449,609
SPACER BLOCK ARRANGEMENT FOR DYNAMOELECTRIC MACHINE WINDINGS
Filed Sept. 29, 1966

INVENTORS
Elmer E. Thiessen
Walter Drabik &
Willard R. Stigler
BY C. L. Meland
ATTORNEY United States Patent Office 3,449,609
Patented June 10, 1969

3,449,609
SPACER BLOCK ARRANGEMENT FOR DYNAMO-
ELECTRIC MACHINE WINDINGS
Elmer E. Thiessen, La Grange, Walter Drabik, Downers
Grove, and Willard R. Stigler, Western Springs, Ill., assignors to General Motors Corporation, Detroit, Mich.,
a corporation of Delaware
Filed Sept. 29, 1966, Ser. No. 582,923
Int. Cl. H02k 3/46
U.S. Cl. 310—260        5 Claims

ABSTRACT OF THE DISCLOSURE

A spacer block arrangement for spacing the end turns of coils of a dynamoelectric machine. A plurality of spacer blocks formed of a hard insulating material are disposed between adjacent conductors. Each block has a recess which is filled with a plastic material. The plastic material connects the conductors and holds the spacer block in place relative to the conductors.

This invention relates to spacer blocks for the coils of electrical apparatus and more particularly to spacer blocks for spacing the end turns of a dynamoelectric machine.

A common arrangement for maintaining a proper spacing between the end turns of the coils of the stator of a dynamoelectric machine is to place small spacer blocks between adjacent conductors and then hand tie the coils together to pull the conductors into tight engagement with the spacer blocks. This is a tedious task particularly where the conductors of the stator of a large dynamoelectric machine must be blocked and laced.

In contrast to the hand lacing method of holding spacer blocks in position between conductors, it is an object of this invention to provide a spacer block arrangement which does not require a lacing of the conductors. In carrying this object forward, a plurality of spacer blocks are provided which are placed between the end turns of the dynamoelectric machine stator and each of these spacer blocks is formed with a recess. With a spacer block in position between the end turn conductors, a plastic material is injected into the recess of the spacer block which adheres to the spacer block and to the conductors. This eliminates the hand lacing operation since the plastic material holds the spacer block in position between the conductors.

Another object of this invention is to provide a spacer block arrangement for conductors where the material that is injected into the recess of the spacer block is a resilient material which adheres to the conductors as well as serving to hold the relatively rigid spacer block in position between the conductors.

A further object of this invention is to provide a method of spacing and blocking electrical conductors where recessed spacer blocks are placed between and in engagement with the conductor end turns and where following this a plastic material is injected into the recess of each spacer block which adheres to the spacer block and conductor end turns.

Further objects and advantages of the present invention will be apparent from the following description, reference being had to the accompanying drawings wherein preferred embodiments of the present invention are clearly shown.

Figure 1:
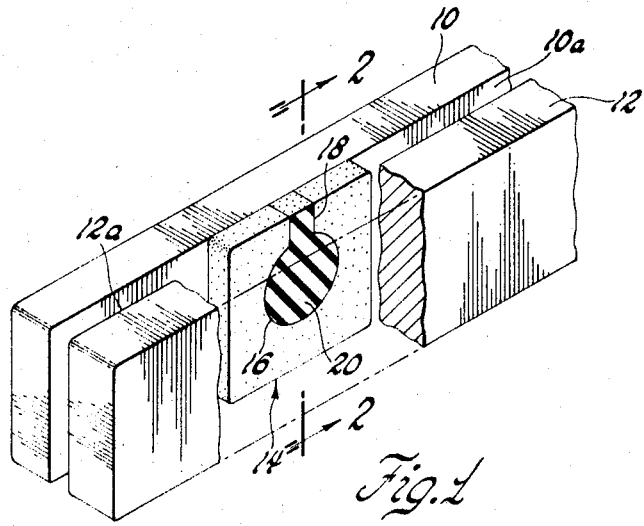
FIGURE 1 is a perspective view partly in section illustrating a spacer block made in accordance with this invention positioned between two conductors of a dynamoelectric machine stator.
Figure 2:
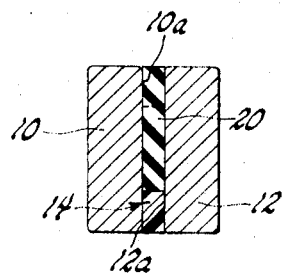
FIGURE 2 is a sectional view taken along line 2—2 of FIGURE 1.
Figure 3:
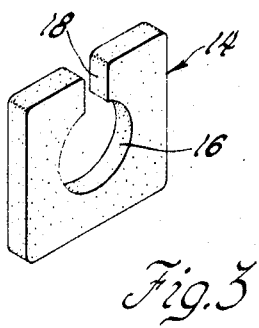
FIGURE 3 is a perspective view of the spacer block shown in FIGURES 1 and 2.

Referring now to the drawings and more particularly to FIGURE 1, the reference numerals 10 and 12 designate electrical conductors which can be a continuation of the diamond shaped end turns of the stator winding of a dynamoelectric machine. These conductors have the usual insulation and are supported by a stator core for the dynamoelectric machine. The end turns have not been illustrated since these are well known to those skilled in the art.

The conductors 10 and 12 are spaced by a spacer block generally designated by reference numeral 14. This spacer block is formed of a rigid insulating material and may be formed, for example, from a polyester glass composition. The spacer block 14 has a recess defined by a circular section 16 and another section 18 which passes through one edge of the spacer block 14.

In assembling the spacer blocks to the stator of a dynamoelectric machine, a number of spacer blocks of various widths are provided and these are placed between and in contact with pairs of conductors such as conductors 10 and 12 of the stator winding. These blocks are preferably inserted midway in the upper and lower diamond sections (not illustrated) of adjacent coils and can be arranged so that the passages 18 on the blocks for the outer diamond section face radially outward whereas the blocks for the inner diamond section face radially inward.

After all the blocks 14 are positioned between the pairs of conductors of the stator winding of the dynamoelectric machine, a quantity of plastic material 20 is injected into the recess of each block through the portion 18 of the recess. With the spacer blocks in place, this can be accomplished by utilizing a gun which forces the plastic material through the passage 18 into the recess 16. The operator simply works around the stator going from block to block until all of them are filled with plastic material.

It will be appreciated from an inspection of FIGURE 1 that when the material is injected into the recess of the spacer block, the material flows into engagement with the inner walls 10a and 12a of the conductors 10 and 12. It, therefore, is seen that the plastic material is injected into a chamber which is defined by the recess 16 and 18 and the inner walls 10a and 12a of the conductors.

It is preferred that the plastic material 20 be a material which is resilient when it is cured in order to dampen vibration between the conductors 10 and 12. It is also preferred that the material be capable of being cured at room temperature. One material that is preferred is a catalyzed silicone rubber sealant which becomes vulcanized at room temperature.

When all of the spacer blocks have been filled with the plastic material, the silicone rubber compound cures at room temperature and a completely blocked stator is then provided. It is noted that the blocking arrangement of this invention is such that the silicone rubber sealant adheres to the conductors as well as to the spacer block and serves to hold the spacer block in position between the conductors. The rubber sealant performs another function because of its resilient character and that is to dampen vibration between adjacent conductors.

While the embodiments of the present invention as herein disclosed constitute a preferred form, it is to be understood that other forms might be adopted.

What is claimed is as follows:

1. A coil spacing arrangement for the conductors of a dynamoelectric machine or the like comprising, a pair of spaced electrical conductors, a spacer block located between said condutors, said spacer block having a recess located between said conductors, said conductors and recess forming a cavity, and a quantity of plastic material located in said cavity, said plastic material connecting said conductors and holding said spacer block in place relative to said conductors.

2. The coil spacing arrangement according to claim 1 where the plastic material is resilient.

3. The coil spacing arrangement according to claim 1 where the plastic material is a catalyzed silicone rubber compound which cures at room temperature to a resilient mass.

4. The coil spacing arrangement according to claim 1 where the spacer block is formed of a hard material and where the plastic material is resilient.

5. A coil spacing and blocking arrangement for the end turns of a stator of a dynamoelectric machine comprising, a plurality of spacer blocks positioned respectively between pairs of conductors of said end turns, each of said spacer blocks having a recess positioned between pairs of conductors, each recess and the walls of a pair of conductors forming a cavity, and a quantity of bonding material located in each cavity, said bonding material connecting said conductors and holding each spacer block in place.

References Cited

UNITED STATES PATENTS 2,980,757   4/1961   Coggeshall _____ 310—270

WARREN E. RAY, *Primary Examiner.*

R. SKUDY, *Assistant Examiner.*